Sept. 8, 1970  D. J. BILINSKI ET AL  3,527,062
UNIVERSAL JOINT FLEXURE HINGE
Filed Sept. 25, 1968  3 Sheets-Sheet 1
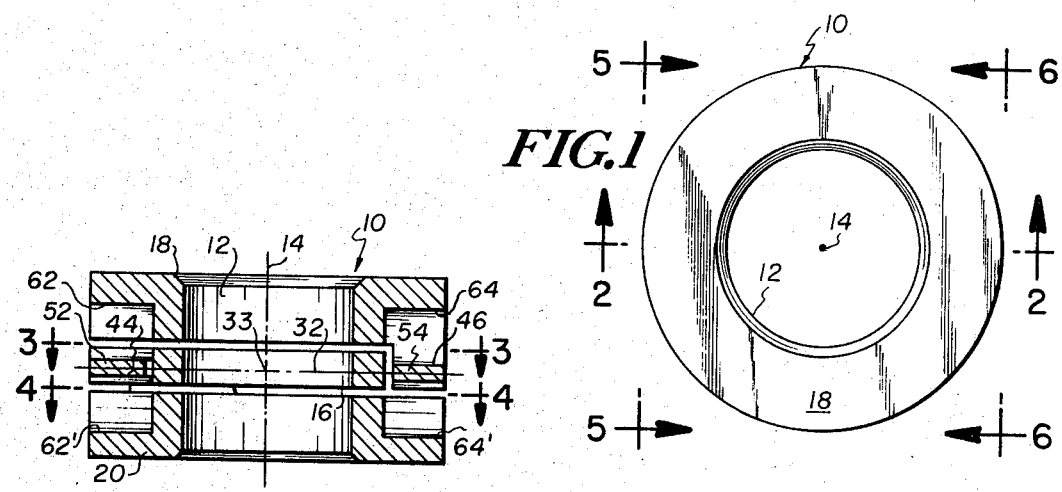
FIG.1
FIG.2
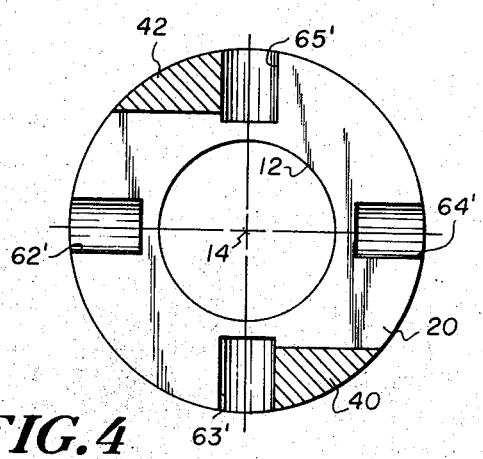
FIG.4
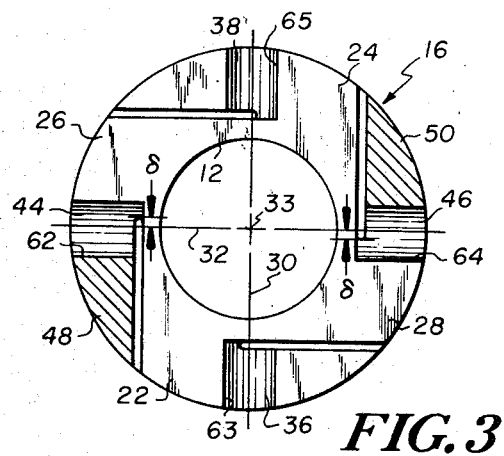
FIG.3
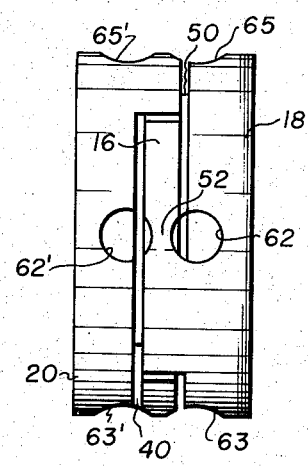
FIG.5
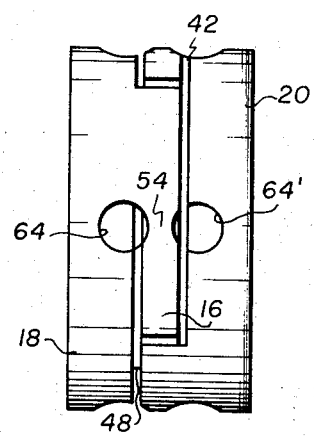
FIG.6
INVENTORS
DONALD J. BILINSKI
GEORGE S. MACOR
BY
ATTORNEY

INVENTORS
DONALD J. BILINSKI
GEORGE S. MACOR
BY
ATTORNEY

United States Patent Office 3,527,062
Patented Sept. 8, 1970

3,527,062
UNIVERSAL JOINT FLEXURE HINGE
Donald J. Bilinski, Randolph Township, Dover County, and George S. Macor, Bloomfield, N.J., assignors to Singer-General Precision, Inc., Little Falls, N.J., a corporation of Delaware
Filed Sept. 25, 1968, Ser. No. 762,514
Int. Cl. F16d *3/52*
U.S. Cl. 64—15                                           9 Claims

ABSTRACT OF THE DISCLOSURE

An extremely compact universal-joint gyroscope flexure hinge is provided comprising an upper gimbal, a middle gimbal, and a lower gimbal. The middle gimbal includes a first pair of diametrically opposed, oppositely extending, cantilevered flexure bars arranged in quadrature with respect to the first pair. The upper gimbal includes a pair of diametrically opposed downwardly extending portions connected respectively to the outer ends of the first pair of flexure bars while the lower gimbal includes a pair of diametrically opposed upwardly extending portions integrally attached to the outer ends of the second pair of flexure bars respectively. With this construction, the upper gimbal may tilt relative to the middle gimbal about an axis passing through the first pairs of flexure arms, and likewise, the lower gimbal may tilt relative to the middle gimbal about a second axis passing through the second pair of flexure bars. In addition, the entire hinge assembly is symmetrical about any of its three principal axes; hence, the hinge's mass center is located substantially at the intersection point of the first and second pivot axis.

BRIEF SUMMARY OF THE INVENTION

The present invention relates generally to the art of gyroscopes and more particularly, to an improvement over the gyroscope disclosed in U.S. Pat. No. 3,354,726 entitled "Two-Axis Gyro" and issued to W. J. Krupick and R. F. Cimera, the patent and the present invention being commonly assigned.

The prior art gyroscope is of the free-rotor type and features a universal joint in the form of a flexure hinge or suspension for interconnecting the gyro's rotor or inertial flywheel to one end of a motor driven spin shaft or the like. The flexure suspension, in turn, comprises an inner hinge unit fixedly connected to an outer hinge unit in a generally concentric and parallel manner. Each hinge unit is composed of three gimbals—upper, middle, and lower—and has two quadrature pairs of oppositely disposed flexure bars for interconnecting the gimbals and for permitting relative tilting of the gimbals about any transverse axis perpendicular to the hinge's central axis. The upper gimbals of the respective hinge units are fixedly coupled together and to the gyro's rotor whereas the lower gimbals of the two hinge units are fixedly connected to each other and to the gyro's spin shaft, respectively. The aforementioned inner hinge unit is designed to contribute high axial strength along the gyro's spin axis while the outer hinge unit is configured to provide the necessary radial and torsional stiffness to the flexure joint assembly. It is thus seen that the characteristics of the two hinge units complement one another to the extent that when used together in unitary assembly, there is provided an effective and efficient flexure joint suspension for coupling the gyro's inertial flywheel to its drive shaft for rotation therewith and for permitting simultaneously universal tilting of the flywheel relative to the drive shaft's spin axis.

One problem with the prior art flexure hinge assembly outlined above is that the outer hinge unit, in particular, is of assymmetrical design. This means that the mass center of the outer hinge unit is offset from the latter's geometric center as defined by the intersection of the two quadrature related flexure hinge axes. The offset, in turn, produces a static gimbal mass unbalance in the plane including the two flexure axes and normal to the spin axis at a gyro null condition. As a result, a rectified drift producing torque component is introduced when the gyro is subjected to axial vibrations along the gyro's spin axis, particularly when such vibrations occur at frequencies equal to twice the angular velocity of the flywheel.

In addition, the assymmetrical configuration of the prior art outer hinge flexure unit also produces therein a further mass offset in the axial direction thereby producing an additional static mass gimbal unbalance about either of the two flexure axes which gimbal unbalance leads to rectified drift producing torques when the gyro is subjected to vibrations normal to its spin axis. And although this last-mentioned static gimbal unbalance may be compensated for by external means as provided for in copending application Ser. No. 761,148 entitled "Method and Means for Calibrating Spring Rate and Gimbal Unbalance in Free-Rotor Flexure-Suspended Gyroscopes," commonly assigned, it would, of course, be preferable to dispense with such external compensating devices.

Therefore, it is a principal object of the present invention to provide a symmetrical flexure hinge unit for use in free-rotor flexure-suspended gyroscopes.

It is a further object of the present invention to provide a flexure hinge unit for use in such gyroscopes wherein the mass center of the hinge unit is coincidental with intersection of the quadrature hinge axes defined by said unit.

It is yet a further object of the present invention to provide a multiple gimbal hinge unit for use in flexure-suspended gyroscopes having minimal static mass gimbal unbalances in the axial and radial directions.

To the accomplishment of these and other objectives, the outer flexure hinge unit in accordance with the present invention comprises a one-piece, three-gimbal, universal-joint suspension having four flexure bar elements suitably arranged in a symmetrical "swastika-like" form about the hinge unit's central axis. With this construction, it is possible to insure coincidence between the hinge's mass center and the intersection of the hinge's two quadrature flexure axes.

Additional objects and advantages as well as a complete and thorough understanding of the invention will be made apparent from a study of the following detailed description of the invention in connection with the accompanying drawings.

BRIEF DESCRIPTION OF THE DRAWINGS

FIG. 1 is a top view of the flexure hinge according to the present invention;

FIG. 2 is a sectional view taken along line 2—2 of FIG. 1;

FIG. 3 is a sectional view taken along line 3—3 of FIG. 2;

FIG. 4 is a sectional view taken along line 4—4 of FIG. 2;

FIGS. 5 and 6 are side views of the flexure hinge according to the present invention;

DETAILED DESCRIPTION OF THE INVENTION

Figure 7:
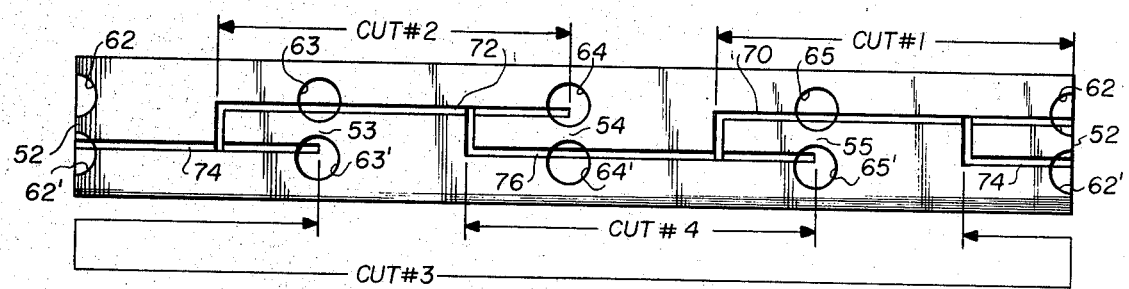
FIG. 7 is an unwrapped view of the peripheral cylindrical side wall of the flexure hinge of FIG. 1.

Referring now to FIGS. 1 through 6, there is shown the universal joint flexure hinge of the present invention in the general form of a right circular cylinder 10 having a central bore 12 or recess passing coaxially therethrough about a first axis of symmetry 14.

Hinge 10 which is preferably machined from a single solid piece of spring metal stock or the like as will be more fully explained below, has three integrally connected but separately displaceable gimbals axially spaced along axis 14 and coaxial therewith. Thus, as shown most clearly in FIG. 2, hinge 10 includes a middle gimbal portion 16, an upper end gimbal portion 18 axially spaced from gimbal 16 along axis 14 on the upper side thereof, and a lower end gimbal portion 20 axially spaced from gimbal 16 along axis 14 on the lower side thereof. From FIGS. 1, 3, and 4, it will be noted that each gimbal portion is symmetrical about axis 14.

Referring now to FIG. 3 in particular, middle gimbal 16 has a first pair of diametrically opposed, outwardly extending arm portions 22 and 24 and a second pair of diametrically opposed outwardly extending arm portions 26 and 28 arranged in quadrature with respect to the first mentioned pair of arms. Arm portions 22 and 24 which are equidistantly radially spaced on respective opposite sides of a first flexure or pivot axis 30 extend substantially parallel to this axis but in opposite directions relative thereto, respectively.

Similarly, arm portions 26 and 28 are equidistantly radially spaced on opposite sides, respectively, of a second flexure or pivot axis 32 which arm portions extend substantially parallel to the second axis in opposite directions relative thereto, respectively.

Flexure axes 30 and 32 are thus perpendicular to one another and to axis 14 with all three axes intersecting at a common point indicated by reference numeral 33. It is a requirement of the present invention that middle gimbal 16 be additionally symmetrical about each of the aforementioned flexure axes and that intersection point 33 substantially coincide with the mass center of gimbal 16 and of the entire hinge assembly 10.

A first pair of diametrically opposed flexure bars 36 and 38 are integrally attached at their respective one ends in cantilever fashion to respective arm portions 22 and 24 and extend in opposite directions relative to flexure axis 30 wherein they are respectively fixedly attached at their other ends to respective ones of a pair of diametrically opposed upwardly extending portions 40 and 42 integral with lower gimbal 20.

Likewise, there is provided a second pair of diametrically opposed flexure bars 44 and 46 integral at their respective one ends with arm portions 26 and 28 and extending in cantilever fashion therefrom perpendicularly and in opposite directions with reference to the flexure axis 32. Flexure bars 44 and 46 are respectively fixedly attached at their other ends to a pair of downwardly extending diametrically opposed portions 48 and 50 common to upper gimbal 18.

Necessarily, flexure bars 36, 38, 44, 46 are of equal dimensions and are equidistantly radially offset from axis 14. Moreover, each flexure bar has a necked-down center portion having a longitudinal axis which is colinear with one or the other of flexure axes 30 and 32. For example, flexure bar 44 has a necked-down portion 52 (FIG. 5) whose cross-sectional longitudinal axis coincides with flexure axis 32 as shown in FIG. 2 and flexure bar 46 has a necked-down portion 54 whose cross-sectional axis also coincides with axis 32. The necked-down portions of flexure bars 36 and 38 are related respectively to flexure axis 34 in an identical manner.

With the above construction, it will be appreciated that upper gimbal 18 has freedom to pivot or tilt relative to middle gimbal 16 through the necked-down portions of flexure arms 44 and 46 and therefore about flexure axis 32, while middle gimbal 16, in turn, has the ability to pivot or tilt relative to the lower gimbal 20 about flexure axis 30 through the necked-down portions of flexure arms 36 and 38. As seen in the plane of FIG. 3, this two-axis flexure bar coupling generally resembles a rather symmetrical "swastika-like" arrangement and thus satisfies the proviso that the middle gimbal and/or the entire hinge be completely symmetrical about each of three principal axes; namely, axis 14, axis 30, and axis 32.

Accordingly, when hinge assembly 10 is used in connection with a free-rotor gyroscope; that is, when the gyro's flywheel is fixedly connected to upper gimbal 18 and the gyro's drive shaft is fixedly coupled to lower gimbal 20, there is provided a frictionless, two-axis, universal joint flexure suspension permitting positive rotation to be transferred from the shaft to the flywheel and permitting simultaneously tilting or pivoting of the flywheel relative to the shaft's spin axis.

What is more, due to the aforementioned symmetry of design or more precisely, owing to the location of the hinge's center of mass substantially at the intersection point of axes 30, 32, and 14, all drift producing static gimbal mass unbalances at the gyro's null condition will be minimized leading to significantly improved performance over the prior art asymmetrical flexure hinge.

A still further advantage of the flexure hinge according to the present invention is its more simple method of manufacture and consequently lower per unit cost than that of the prior art design.

In this regard, it will be recalled that the hinge assembly 10 is to be machined from a single solid piece of stock originally presented in the form of a right circular cylinder having a central bore or recess passing coaxially therethrough. This machining procedure which constitutes an important feature of the present invention, is divided essentially into two basic operations; namely, (1) the drilling of four equidistantly spaced pairs of blind holes in the outer peripheral wall of the cylinder to form the necked-down center portions of each of the respective flexure bar elements, and (2) the machining of two pairs of axially spaced L-shaped dihedral cuts or slots intermediately through the cylinder to form the three separate gimbal portions and to free the flexure bar elements for flexing about their respective longitudinal axes.

To illustrate further, consider now FIG. 7 which shows an unwrapped view of the cylindrical hinge's outside peripheral side wall surface. The four pairs of blind holes 62, 62'; 63, 63'; 64, 64'; 65, 65' are drilled therein such that the two center lines associated with each pair of holes, respectively, are parallel to each other and are normal to and in intersecting relation with axis 14 (see FIGS. 3 and 4). In addition, all eight holes have identical depths and are of the same diameter with the corresponding holes making up each distinct pair being equidistantly axially spaced from one another, respectively.

The four dihedral slots 70, 72, 74, 76 are then formed with their L-shaped cross-sections normal to axis 14. Note that slots 70 and 72 are spaced 180° apart, are coplanar, and are axially spaced from slots 74 and 76 which latter are also coplanar and spaced 180° apart with respect to each other. Moreover, it will be appreciated that slots 70 and 72 are reversed in sense relative to slots 74 and 76 and are in quadrature therewith respectively.

In forming the blind holes, it is important that high accuracy be maintained to insure coincidence between the longitudinal axes of each pair of diametrically opposed flexure axes. This means that the necked-down portions between the corresponding pairs of holes must be substantially coplanar and of substantially equal dimensions. Also, it is essential that the L-shaped slots be accurately machined in order to substantially locate the intersection point of the two flexure axes at the hinge's center of mass. In order to meet these objectives, it is preferable to employ a highly accurate machining process such as electrical discharge machining, for example, to form the blind holes and L-shaped dihedral cuts, respectively.

Briefly stated, conventional electrical discharge machining (or EDM as it is more simply referred to), relates to the controlled removal of material from an electrically conductive work piece through a process of melting or vaporization induced by a high frequency electrical spark discharge between the work piece and a tool or electrode. The spark discharge is produced by pulsing a direct curent between the work piece which is usually positively charged and the electrode which is usually negatively charged. This requires that the eletcrode and the work piece be always separated by a spark gap which may be as small as, say, 0.0002 inch, for example, while both are immersed in or flooded by a dielectric fluid medium. The dielectric in the gap is partially ionized under the pulsed application of a high voltage and thus enables the spark to discharge across the gap between tool and work piece. Each spark produces enough heat to melt or vaporize a small quantity of the workpiece, leaving a microscopic pit or crater in the surface of the work.

In addition to its high accuracy, EDM has the further advantage of being able to make odd shaped or complex cuts by simply having the electrode conform to the mirror image of the shape of cut desired. For example, in drilling holes 62 through 65 and 62' through 65', the electrode would comprise a cylindrical pin undersized by the dimensions of the spark gap being employed. Likewise, in making the L-shaped dihedral cuts 70 through 76, the tool might take the form of the electrode 78 shown in FIG. 8, again being undersized by the dimensions of the spark being used. In operation, the electrode, whatever shape it may have, is usually hydraulically advanced into the work piece under servo control in order to maintain the spark gap constant with the servo getting its input signal from the difference between a selected reference voltage and the actual voltage across the gap.

Figure 8:
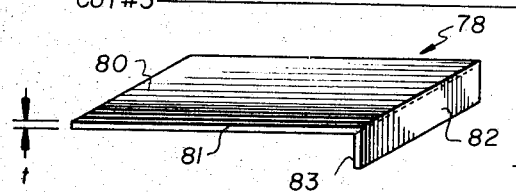
FIG. 8 is a perspective showing a tool used in the fabrication of the flexure hinge according to the present invention.
Figure 9A:
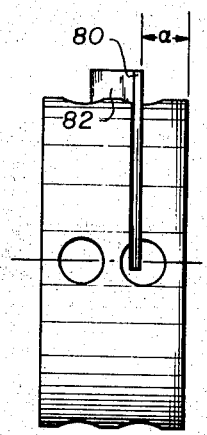
FIGS. 9A through 12C are views showing the sequence of machining steps employed in fabricating the flexure hinge of the present invention.
Figure 9B:
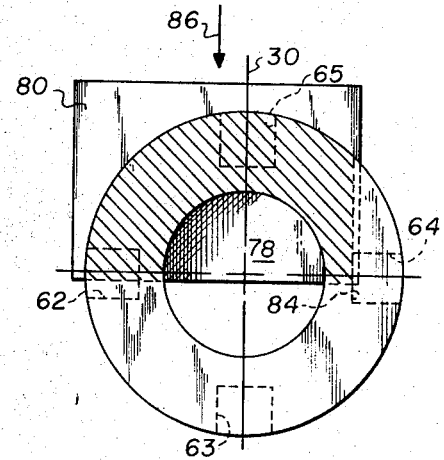
Figure 9C:
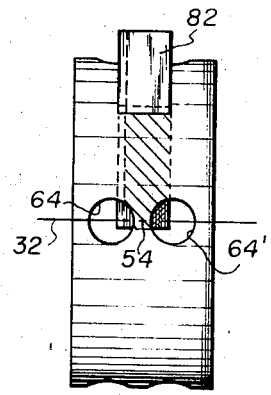

Turning now to FIGS. 9 through 12, the preferred sequence of machining the L-shaped dihedral cuts 70 through 76 will now be described, it being assumed that the eight blind holes 62 through 65 and 62' through 65' have already been formed in the right circular cylindrical work piece on a conventional EDM machine. The electrode tool 70 of FIG. 8 is then properly chucked into the machine's tool holder and the work piece set up relative thereto so that the horizontal portion 80 of the electrode (see FIG. 8) is axially spaced downwardly with respect to the upper surface of the work piece by an amount $\alpha$ as shown in FIG. 9A. In addition, electrode 70 is oriented so that the leading edge 81 of its upper portion 80 is aligned parallel to flexure axis 32 and/or to the common center line of blind holes 62 and 64. Furthermore, the downwardly extending portion 82 of electrode 78 has its inner surface 83 aligned paralllel to flexure axis 30 and/or the common center line of blind holes 63 and 65 and is substantially in coplanar relation with regard to the end walls 85, 85' of blind holes 64, 64'. The electrode is then advanced into the work piece along the direction indicated by arrow 86 and parallel to the plane including flexure axes 30 and 32 until it reaches the position substantially as shown in FIGS. 9A through 9C, at which point cut 70 is completed and the electrode is withdrawn from the work piece. The effect of this cut, labeled as cut #1 in the unwrapped view of FIG. 7, is to remove material from the work piece in the plane areas represented by the cross-hatched lines in FIGS. 9B and 9C, respectively. It is to be understood, of course, that the cut is actually three-dimensional having a thickness equal to that of the electrode (dimension $t$, FIG. 8) plus the dimensions of the spark gap. The thickness of cut #1 is clearly shown in FIG. 7 and in FIG. 9A.

Figure 10A:
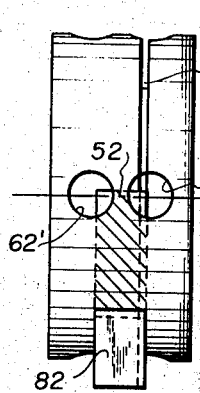
Figure 10B:
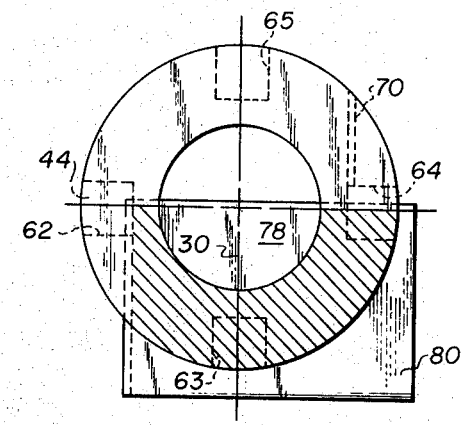
Figure 10C:
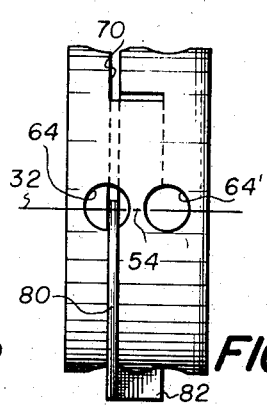

The next cut 72 is made by simply indexing the electrode relative to the work piece by an amount equal to 180° with reference to the work piece axis 14 and then advancing the tool into the workpiece along the direction of arrow 87 to the position shown in FIGS. 10A through 10C. This second cut, as indicated in FIG. 7, is coplanar with respect to cut #1 and thus forms the upper gimbal 18 of hinge 10.

Figure 11A:
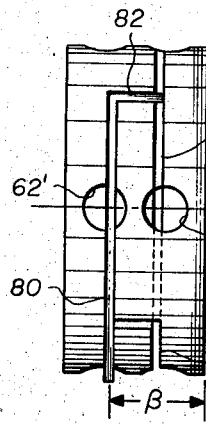
Figure 11B:
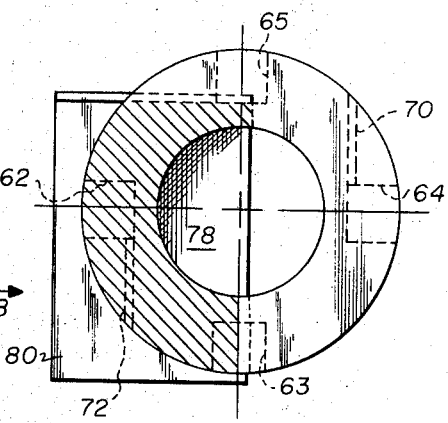
Figure 11C:
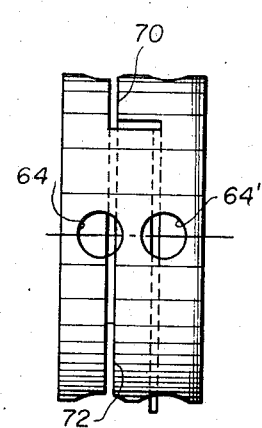
Figure 12A:
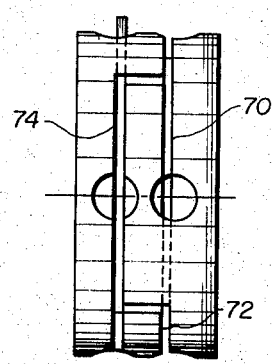
Figure 12B:
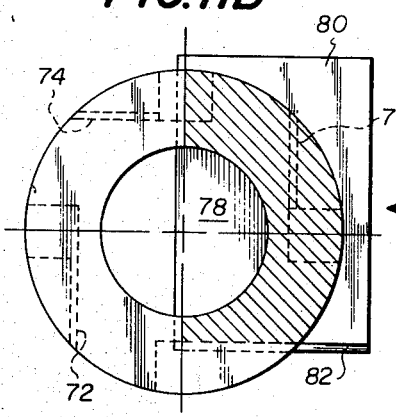
Figure 12C:
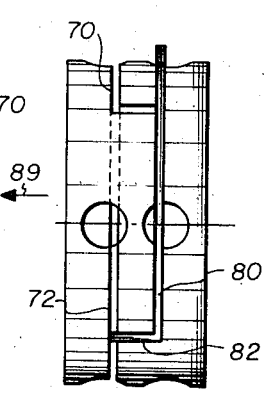

Tool 78 is then withdrawn, flipped over 180° on its own longitudinal axis and indexed 90° counterclockwise with respect to the work piece central axis 14. There the tool is lowered to an axial depth, $\beta$, as indicated in FIG. 11A, before being advanced into the work piece along the direction of arrow 88 as shown in FIG. 11B. This completes cut 74, the third EDM L-shaped dihedral cut in the sequence. To make the fourth and final cut; namely, cut 76, the tool is withdrawn from the work piece, indexed 180° relative to axis 14 and then advanced into the work piece along the direction of arrow 89 as shown in FIGS. 12A through 12C. Cuts 74 and 76 being coplanar thus forms the middle gimbal portion 16 and the lower gimbal portion 20 and thereby complete the fabrication of the three-gimbal, two-axis, four-flexure bar, symmetrical hinge described hereinabove in connection with FIGS. 1 through 6.

Figure 13:
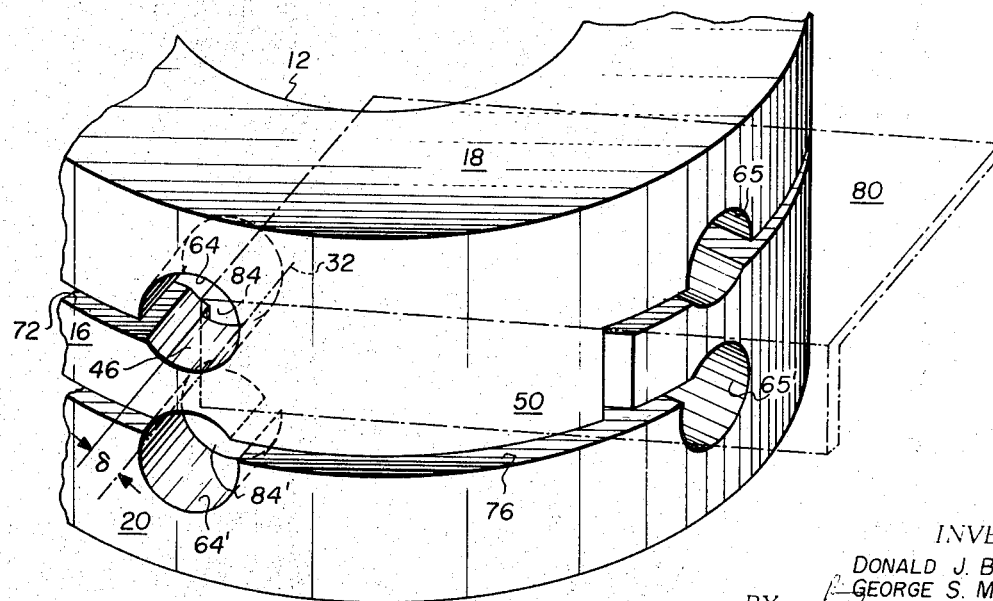
FIG. 13 is a perspective detail of an enlarged portion of FIG. 6.

Although the preferred method of machining the L-shaped dihedral cuts 70 through 76 as described above involved the sequential indexing of a single electrode tool relative to the work piece, it will be understood that a plurality of similar electrodes may be used simultaneously to save time. For example, cuts 1 and 2 may be machined simultaneously utilizing a pair of diametrically opposed tools followed by the simultaneous machining of cuts 3 and 4 with a second pair of diametrically opposed electrodes positioned in quadrature with respect to the first mentioned pair of tools. However, when this alternative method of machining is employed, the rate of advance of each opposing tool into the work piece respectively must be staggered slightly to insure that the leading edge of each electrode overcuts the work piece center line without tool interference, such overcut being indicated by the Greek letter $\delta$, for example, in FIG. 3. The effect of this radial overcut may be best appreciated by referring to FIG. 13 which shows in perspective a detailed portion of the completed hinge assembly 10 and particularly of flexure bar 46 which is integral between middle gimbal 16 and the downwardly extending portion 50 of upper gimbal 18. The configuration of electrode 78 during the machining of the dihedral L-shaped cut 70 is also represented by the broken lines to indicate the formation of this flexure bar. Note that by overcutting beyond center line axis 32 by an amount $\delta$ as shown, the flexure bar is cut away from the rear walls 84 and 84' of blind holes 64 and 64' and thus is permitted to freely flex about the longitudinal axis passing through the cross-section of its extreme necked-down portion which axis, of course, defines the flexure axis 32. In this manner, the different flexure bars 36, 38, 44, 46, are respectively formed in sequence by each corresponding dihedral L-shaped cut 76, 74, 72, 70.

Obviously, many additional variations and modifications will be apparent to those skilled in the art without departing from the principles of the present invention.

We claim:
1. A one-piece universal joint flexure hinge for use in free-rotor flexure suspended gyroscope comprising:
   an upper gimbal, a middle gimbal, and a lower gimbal axially spaced from one another along a first longitudinal axis,
   said middle gimbal having a first pair of diametrically opposed oppositely extending flexure bars defining a first pivot axis in normal intersection relation with said first longitudinal axis and a second pair of diametrically opposed oppositely extending flexure bars in quadrature with said first mentioned pair of flexure bars for defining a second pivot axis normal to and in common intersecting relation with said first longitudinal axis and said first pivot axis respectively, said upper gimbal having a pair of diametrically opposed downwardly extending portions integral with said first pair of flexure bars respectively, and said lower gimbal having a pair of diametrically opposed upwardly extending portions integral with said second pair of flexure bars respectively, wherein said two pairs of flexure bars and said first and second pivot axes form a swastika-like arrangement in the plane of the middle gimbal normal to said first longitudinal axis.

2. The flexure hinge of claim 1 wherein each of said flexure bars has a necked-down cross-sectional portion coinciding with its respective pivot axis.

3. A flexure hinge for gyroscopes comprising a middle gimbal symmetrically disposed about three mutually orthogonal commonly intersecting principal axes, an upper gimbal axially spaced from said middle gimbal along a first one of said axes and adapted for tilting relative to said middle gimbal about a second one of said axes, and a lower gimbal axially spaced from said middle gimbal along said first axis and adapted for tilting relative ot said middle gimbal about a third one of said axes, said upper, lower and middle gimbals each being equally radially offset relative to said first axis for forming an integral universal joint assembly having its mass center coincidental with said common intersection corresponding to said three principal axes and having high radial and torsional strength relative to said first axis.

4. A universal joint hinge comprising a middle gimbal having a pair of quadrature pivot axes and a central longitudinal axis orthogonally related to said pair of pivot axes at a common intersecting point, an upper gimbal spaced axially above said middle gimbal along said longitudinal axis, and a lower gimbal spaced axially below said middle gimbal along said longitudinal axis, wherein said middle gimbal includes a first pair of arm portions radially spaced from one of said pivot axes on either side thereof respectively and extending parallel thereto in opposite directions, a second pair of arm portions radially spaced from said other pivot axis on opposite sides thereof respectively and extending parallel thereto in opposite directions, said first and second pairs of arm portions being substantially coplanar in the plane including said quadrature pivot axes, a first pair of flexure elements integral with said first pair of arm portions respectively at one end thereof and extending in cantilever fashion therefrom perpendicularly and in intersecting relation with said first one of said pivot axes, a second pair of flexure elements integral with said second pair of arm portions respectively at one end thereof and extending in cantilever fashion therefrom perpendicularly and in intersecting relation with said other of said pivot axes, said upper gimbal having a pair of diametrically opposed downwardly extending portions connected to said first pair of cantilevered flexure elements at the respective other ends thereof for permitting relative tilting between said upper gimbal and said middle gimbal through said first pair of flexure elements and about said first mentioned pivot axis, and said lower gimbal having a pair of diametrically opposed upwardly extending portions connected to said second pair of cantilevered flexure elements at the respective other ends thereof for permitting relative tilting between said lower gimbal and said middle gimbal through said second pair of flexure elements and about said second pivot axis.

5. The hinge of claim 4 wherein said flexure elements are equidistantly radially offset from said longitudinal axis.

6. The hinge of claim 4 wherein said first and second pairs of flexure elements each have identical necked-down center portions having thin rectangular cross sections for defining said pivot axes, respectively.

7. The method of fabricating a one-piece, two-axis, three-gimbal, four-flexure bar, universal joint flexure hinge from a solid right circular cylinder comprising the steps of drilling four pairs of adjacently separated blind holes equidistantly spaced around the peripheral side wall of said cylinder substantially intermediately thereof to form two pairs of diametrically opposed necked-down flexure bars, cutting a first pair of diametrically opposed dihedral L-shaped slots in a plane axially spaced above said flexure bars for forming an upper gimbal and for freeing one of said diametrically opposed pairs of flexure bars for flexure about a first pivot axis passing through said freed pair of flexure bars, and cutting a second pair of diametrically opposed dihedral L-shaped slots in a plane axially spaced below said flexure bars for forming a middle gimbal and a lower gimbal and for freeing said other pair of diametrically opposed flexure bars for flexure about a second pivot axis passing through said other pair of freed flexure bars.

8. The method of fabricating a one-piece, two-axis, three-gimbal, four-flexure bar, universal joint flexure hinge from a solid right circular cylinder comprising the steps of drilling four pairs of equal sized blind holes in the peripheral side wall of said cylinder intermediately thereof, the center lines of said holes corresponding to each of said pairs being parallel to each other and in normal intersecting relation with the cylinder's central longitudinal axes whereby each of said pairs comprises adjacently separated axially aligned holes having a necked-down connecting side wall portion therebetween, said four pairs of holes being equidistantly spaced around the circumference of said cylinder to form two quadrature pairs of diametrically opposed necked-down connecting side wall portions, cutting a first radial L-shaped dihedral slot in said cylinder, said slot having one of its characteristic cross sectional dimensions located in a plane normal to said central axis and passing through corresponding upper ones of said pairs of axially aligned holes, the other characteristic cross-sectional dimension of said L-shaped slot being located in a plane parallel to said central axis and passing perpendiculrly through a first selection one of said necked-down connecting sidewall portions substantially inwardly thereof, cutting a second radial L-shaped dihedral slot in said cylinder identical to said first slot but rotated 180° with respect thereto whereby said other characteristic cross-sectional dimension of said second L-shaped slot passes perpendicularly through a second selected necked-down connecting side wall portion substantially inwardly thereof, said second side wall portion being diametrically opposed to said first selected side wall portion, cutting a third radial L-shaped dihedral slot in said cylinder, said third slot having one of its characteristic cross-sectional dimensions located in a plane normal to said central axis and passing through corresponding lower ones of said pairs of axially aligned holes, the other characteristic cross-sectional dimension of said third L-shaped slot being located in a plane parallel to said central axis and passing perpendicularly through a third selected one of said necked-down connecting side wall portions substantially inwardly thereof, and cutting a fourth radial L-shaped dihedral slot in said cylinder identical to said third slot but rotated 180° with respect thereto whereby said other characteristic cross sectional dimension of said fourth L-shaped slot passes perpendicularly through a fourth selected necked-down connecting side wall portion substantially inwardly thereof, said fourth side wall portion being diametrically opposed to said third selected side wall portion.

9. The method of claim 8 wherein the radial extent of each of said dihedral L-shaped slots extends beyond the center line of said cylinder's circular cross section by a predetermined amount.

References Cited
UNITED STATES PATENTS

| | | | |
|---|---|---|---|
| 3,288,541 | 11/1966 | Tracy | 64—15 X |
| 3,354,726 | 11/1967 | Krupick et al. | 74—5 |
| 3,360,255 | 12/1967 | Ormond | 64—15 X |
| 3,394,970 | 7/1968 | Tracy | 64—15 X |
| 3,427,828 | 2/1969 | Stiles | 64—15 |

JAMES A. WONG, Primary Examiner